Dec. 26, 1961    H. H. G. ROWE ETAL    3,014,557
FLUID BUFFER INSTALLATIONS AND METERING THEREFOR
Filed July 25, 1955    2 Sheets-Sheet 1

Henry H.G. Rowe &
Ulrich M. Geissler
INVENTORS.

BY Charles J. Worth
AGENT.

Henry H.G. Rowe &
Ulrich M. Geissler
INVENTORS.

United States Patent Office 3,014,557
Patented Dec. 26, 1961

3,014,557
FLUID BUFFER INSTALLATIONS AND
METERING THEREFOR
Henry H. G. Rowe, 4 Southard St., Baldwin, N.Y., and
Ulrich M. Geissler, 211 Sportsmans Ave., Freeport,
N.Y.
Filed July 25, 1955, Ser. No. 523,997
3 Claims. (Cl. 188—100)

This invention relates generally to fluid buffer arrangements and more specifically to the metering thereof.

At the present time, fluid energy absorbing devices (fluid buffers) are generally controlled by either a restricted port or by a variable metering arrangement which is variable relative to the piston stroke. These devices are permanent installations in the piston or cylinder, devised to work under a predetermined condition and when these conditions are altered, a completely new unit is required.

An object of this invention is to provide a metering unit for fluid energy absorbers which may be located in any part of a system.

Another object of this invention is to provide a metering device for fluid buffers which is adjustable to smaller changes of predetermined working ranges.

Still another object of this invention is to provide a metering device for fluid energy absorbing installations capable of being modified by a simple change of parts to accommodate a large variation of predetermined working conditions.

Yet another object of this invention is to provide a fluid energy absorbing device with a variable metering arrangement, the metered flow being controlled by the fluid pressure acting upon the metering device.

And another object of this invention is to provide a fluid energy absorbing device with a variable metering arrangement capable of keeping the piston stroke and speed constant under varying forces.

And still another object of this invention is to provide a metering valve for fluid energy absorbers in which the reaction of the pressures of the metered fluid flow exert balanced forces on the metering pin.

Figure 1:
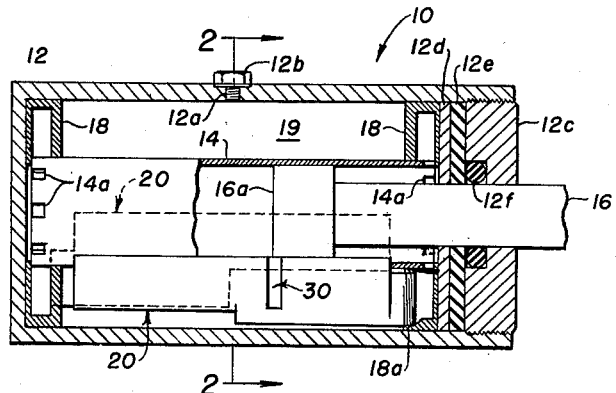
Figure 4:
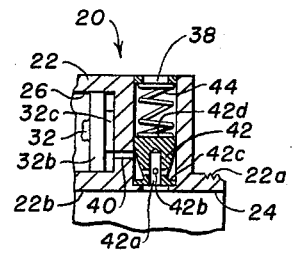
Figure 2:
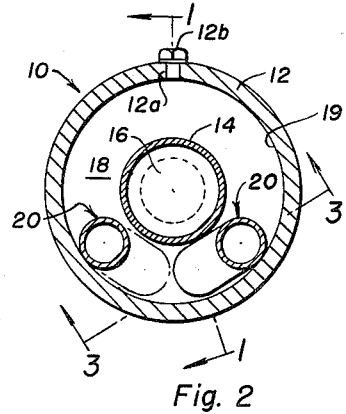
Figure 3:
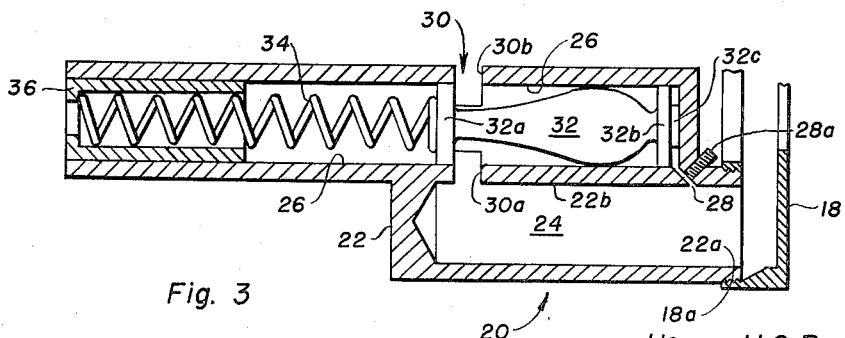
Figure 5:
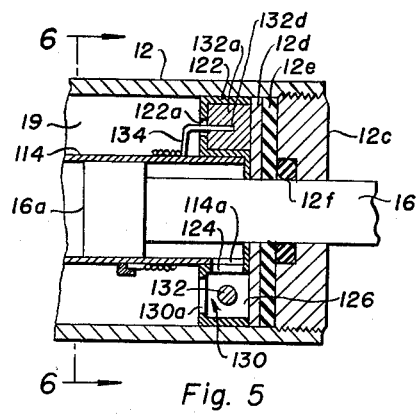
Figure 6:
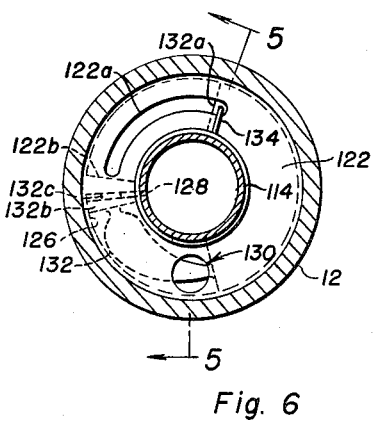
Figure 7:
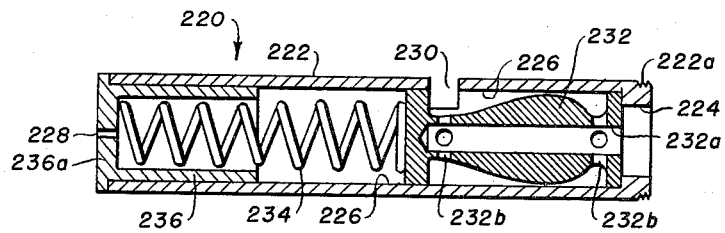
Figure 8:
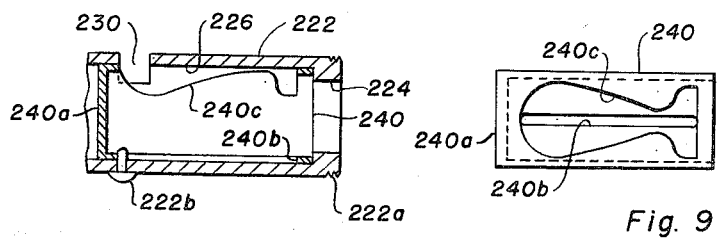
Figure 9:
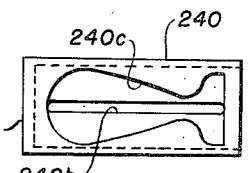

These and other objects will become more apparent by referring to the description and accompanying drawings wherein:

FIGURE 1 is a sectional elevation taken on the plane of line 1—1 of FIGURE 2 of a fluid buffer unit incorporating metering devices, FIGURE 2 is a sectional view taken on line 2—2 of FIGURE 1, FIGURE 3 is a sectional elevational view of the metering device taken on the plane of line 3—3 of FIGURE 2, FIGURE 4 is a sectional view of a modified portion of FIGURE 3, FIGURE 5 is a sectional elevation of a portion of a fluid buffer incorporating a modified metering arrangement, FIGURE 6 is a sectional view taken on line 6—6 of FIGURE 5, FIGURE 7 is a sectional elevation similar to FIGURE 3 of a modified form of the metering device, FIGURE 8 is a sectional elevation of a part of FIGURE 7 including a modified metering pin and FIGURE 9 is a plan view of the metering pin of FIGURE 8.

While this invention is described in but one embodiment, specifically a loom buffer, it should be noted that this is not necessarily the preferred environment, nor should it be limited thereto as this arrangement has been merely utilized for the ease and clarity of description. The system as illustrated, embodies a piston chamber which is subdivided into two chambers by a piston, each of said chambers having an inlet-outlet port, said chambers and their respective ports forming part of a closed hydraulic system including a reservoir and one or more metering devices hydraulically interconnected between said inlet-outlet ports, said metering devices being in constant communication with the fluid.

Now referring to FIGURES 1 and 2, a loom buffer 10 has an outer cylinder 12, an inner cylinder 14 and a piston 16. At both ends of the cylinder 14 are notches or recesses 14a which permits communication from the inner cylinder 14 to U-shaped rings or valve bases 18 into which the cylinder 14 extends. The outer flange of the valve bases 18 is larger than the inner flange thereof and forms a seat for the ends of the cylinder 14. One valve base 18 seats against the end wall of the outer cylinder 12 and the other valve base is backed by a plate 12d which is followed by sealing rings 12e and 12f, the complete assembly being locked in place by the nut 12c. The piston 16 extends through the sealing assembly and has a piston head 16a which is a slide fit and travels within the cylinder 14. The outer cylinder 12 has a threaded filler port 12a at the top thereof and is closed by a seal and bolt 12b. The valve bases 18 have a threaded opening 18a in the inner flange into which are threaded the metering valves 20, the openings 18a being located at the bottom of the buffer 10 and being offset from one another to permit adjacent installation of the valves 20. The chambers formed within the inner cylinder are completely filled with fluid and the outer chamber is permitted a small air chamber at the top. This entrapped air is retained to permit additional fluid displacement by the piston by compressing that air and thus the buffer unit does not require an overflow or vent and may be a sealed unit.

As the piston 16 moves, fluid is displaced from the contracting inner chamber, through ports or openings 14a into the valve base 18 and thence through the associated metering valve 20 to the outer chamber 19. The overflow into the chamber 19 passes through the opposite metering valve 20, in a reverse direction, to the associated valve base thence through the ports or openings 14a into the expanding inner chamber.

Now referring to FIGURE 3, the metering valve has a body 22 which is threaded at 22a to permit it to be screwed into the opening 18a of the valve base 18. An inlet port 24 communicates with the valve base 18 and extends generally parallel to a valving chamber 26 which houses the metering pin 32 and is separated therefrom by an internal wall 22b. There is a pressure metering port 28 which joins the inlet port 24 and the base of the valving chamber 26 and a second opening or void 30a in the wall 22b again joining the inlet port 24 at its base to the valving chamber 26. There is an opening or void 30b in the body 22 opposite the opening 30a and the two openings 30a and 30b form the valving port 30 which connects the inlet port 24 to the chamber 19. A restrictor 28a, in the form of a set screw or the like, is adjustably mounted in the body 22 and extends into the pressure metering port 28 to regulate the flow of fluid and thereby determine the amount of fluid which may act upon the metering pin 32.

The metering pin 32 has end flanges 32a and 32b with a reduced land 32c outward of the flange 32b which seats against the end wall of the valving chamber 26 when the metering pin 32 is in the inoperative position forming a pressure chamber which is in constant communication with the pressure metering port 28. The thickness of the body of the metering pin 32 is not uniform and has a neck portion adjacent the flange 32a and enlarges to a bulb as it extends axially, the bulb substantially filling the valving chamber 26 and thence sharply reduces to a second neck portion adjacent the flange 32b.

The invention is not limited to any particular non-uniform physical shape of metering pin, because, as shown in the several figures of the drawing, the non-uniform shape of said metering pin will vary according to the particular valving conditions of the buffer installation which is to be controlled by the metering pin. The metering pin 32 is biased towards the base of the chamber 26 by a spring 34 which is retained within the chamber 26 by a flanged tubular insert 36. The tubular insert may be held in the end of the chamber 26 by welding or freezing or may be merely a threaded member.

In operation, the pressurized fluid enters the port 24, a portion thereof traversing through the pressure port 28 to the pressure chamber formed between the end wall of the valving chamber 26 and the flange 32b of the metering pin 32. The bulk of the fluid passes through the valving port 30, past the metering pin 32, into the chamber 19. The greater the force on the piston, the greater the fluid pressure acting on the metering pin in the pressure chamber. The meterinng pin travels against the spring a distance relative to the fluid pressure and as the bulb of the metering pin approaches the valving port, this port is restricted to a greater degree to create a greater resistance to movement of the piston and provide an approach to a balance of forces acting on the piston.

FIGURE 4 illustrates an automatically variable pressure port control mechanism wherein a transfer port 38 extends transverse to the valve body 22 and communicates with the base of the valving chamber 26 through a passage 40. A metering valve 42, having a central bore 42a and radiating ports 42b, is housed in the port 38 and is biased toward the inlet 24 by the spring 44. The valve 42 has a head portion 42d which tapers to a neck adjacent a base flange 42c. The passage 40 is located before the head portion 42d so at no time can it be completely closed by the valve 42. Fluid entering the transfer port 38 from the inlet drives the valve 42 against the spring 44 which reduces the metering effect of the valve 42 on the passage 40 thus permitting a greater fluid flow therethrough to act on the metering pin 32. With this type of a pressure metering arrangement, the range of working pressures is greater than the pressure range developed by fluid displacement by the piston head 16a.

Referring now to FIGURES 5 and 6, a modified inner cylinder 114, having one port 114a in each end seats in a valve housing 122 which has an inlet port 124 aligned with the port 114a. An exhaust port 130a is located in the inner wall of the annular housing 122 and cooperates with the ports 114a and 124. The three orifices 114a, 124 and 130a form the valving port 130. The annular housing 122 encloses a circular valving chamber 126. An arcuate metering pin 132, being housed in the valving chamber 125, has a flange 132b, and outwardly thereof, a reduced land 132c which abuts a radial wall 122b, the space between the wall 122b and the flange 132b forming a pressure chamber which communicates with the chamber within the cylinder 114 through a pressure metering port 128. The metering pin 132 has an enlarged body portion 132a which substantially fills the chamber 126 and has a small hole 132d at the end thereof, for receiving the end of a torsion spring 134 which extends through a slot 122a, the body portion of the spring being wound around the cylinder 114 and being fixed thereto. The spring 134 tends to bias the metering pin 132 toward the open position. Metering pin 132 when actuated moves with a circular motion in chamber 126 of annular housing 122. As in the installation illustrated in FIGURE 3, both metering valves are identical and therefore only one end of the buffer has been shown.

The remaining FIGURES 7, 8 and 9 illustrate a simplified modification of the metering valve, the metering pin in FIGURE 7 having a formed or shaped body as the metering pin 32 in FIGURE 3 while the metering pin in FIGURES 8 and 9 is a tubular member having a slot in the top side thereof which forms an irregular orifice which in cooperation with the exhaust port acts to meter the fluid flow.

The modified metering valve 220 has a tubular valve body 222 being externally threaded at one end 222a to permit its assembly with the valve base 18. The body has a central chamber 226 which is reduced at the threaded end 222a to form an inlet 224. A metering pin 232 is housed in the chamber 226 and is biased towards the inlet 224 by a spring 234 which, in turn, is retained in the chamber 226 by a tubular insert 236 having an end wall 236a in which there is a pressure metering port 228. The metering pin 232 is basically the same as the metering pin 32 and has a central bore 232a, which is open at the inlet end only, which communicates with the chamber 226 through a plurality of ports 232b which pass through the neck portions.

In operation, the fluid enters the inlet 224, then into the central bore 232a of the metering pin 232, thence passes into the chamber 226 through the ports 232b. The fluid head drives the pin 232 against the spring 234. The portion of the chamber 226 which houses the spring 234 is filled with fluid and the pressure metering to control the travel of the metering pin 232 is accomplished by the pressure metering port 228.

In FIGURES 8 and 9 a tubular metering pin 240 having an end wall 240a is illustrated. In place of the ports and irregular body of the metering pin 232, an irregular slot 240c is cut in the top of this metering pin and cooperation between the slots 240c and the exhaust 230 accomplish the metering of the fluid flow. A guide pin 222b is retained in the base of the body 220 and extends into an elongated slot 240b to present the metering pin 240 from rotating.

Having described and illustrated the metering valve, its modifications, installation and operation;

We claim:

1. A valve useful for automatically controlling the flow of a fluid between sources of differing pressure including a source of higher pressure and a source of lower pressure and comprising a chambered housing, said housing chamber being contoured to receive a valve-unit, said valve-unit comprising a pair of pistons and an elongated stem, said stem comprising a coaxial series of frusta, said frusta adjoining each other lengthwise of said stem, each frustum being symmetrical about said stem but varying in volumetric value from the adjoinind frusta, certain of said frusta having distinctively different volumetric values disproportionate to the volumetric values of their adjoined frusta, said coaxial series of frusta in conjunction defining an elongated cam having a lengthwise-extending surface of irregular contour, said pistons being coupled coaxially to the oppositely disposed ends of said elongated cam to complete the assembly of said valve-unit, said valve-unit being mounted for axial movement within said housing chamber, said spaced pistons coacting with the walls of said housing chamber to subdivide said housing chamber into an axially movable valving chamber and two axially variable end compartments, each of said end compartments being confined by and between one of said axially movable pistons and a wall of said housing, said valving chamber being coextensive with said valve-unit in all positions thereof, one of said end compartments being a pressure metering compartment and the other a low pressure compartment, a spring cooperating with said valve-unit to bias said valve-unit in normal position toward said pressure metering compartment, a port for connecting said low pressure compartment to said source of lower pressure, a port for connecting said metering compartment to said source of higher pressure and in response to such higher pressure overcoming the biasing effect of said spring and moving said valve-unit in the direction of said low pressure compartment and thus exhausting said low pressure compartment into said source of lower pressure, means for adjustably regulating the passage of fluid into said metering compartment, radially oppositely spaced coaxially aligned portholes passing through opposite walls of said valving chamber, said portholes and said valving chamber in conjunction forming a valve passage which traverses said valving chamber in every position of said valve-unit to interconnect said sources of differing pressure through said valving chamber, said valve-unit in every position thereof always interposing a portion of said cam transverse that portion of said valve passage which traverses said valving chamber to cause said cam to constantly control the passage of fluid through said valve passage, and any portion of said cam so interposed always being symmetrically aligned between and relative to both of said portholes irrespective of the position of said valving chamber within and relative to said housing chamber so that although the pressure within said valving chamber will vary with every change of pressure effected between said sources of pressure, any such variation in pressure will always be uniform in every part of such valving chamber and will therefore have no adverse effect either upon the operation of said valve-unit or upon the flow-control efficiency of said cam.

2. In a fluid energy absorber and in combination a metering valve having a body and a valving chamber in said body, a metering pin movable axially within said chamber, a spring housed in the chamber which biases the pin toward the base thereof, an inlet port, a valving port and a pressure metering port all in communication with said valving chamber, the pressure metering port controlling the amount of fluid acting on said metering pin, the valving port in cooperation with the pin metering the fluid flow which is exhausted from the metering valve in a direction transverse to the axial movement of the pin in the valving chamber so that the pressures of the metered flow exert balanced forces on the metering pin, a piston and cylinder arrangement comprising an outer cylinder and an inner cylinder, valve bases spacing said two cylinder elements, a piston traveling in the inner cylinder and forming two chambers therein, a plurality of ports in the ends of the inner cylinder which connect the chambers therein with said valve bases, and a third chamber formed between the two cylinders in communication with the valve base through the metering valve which is housed in said third chamber and is joined to said valve base.

3. A closed hydraulic system including a reservoir, a working cylinder having inlet-outlet ports at its opposite ends, a metering valve having a body portion containing a valving chamber, a metering pin and a spring follower therefor housed within said valving chamber, said pin being movable axially within said chamber, and said spring follower normally biasing said pin towards the base of said chamber, an inlet port, a valving port and a pressure metering port all in communication with said valving chamber, the pressure metering port controlling the amount of fluid acting on said metering pin to control its axial movement, the valving port in cooperation with the pin metering the fluid flow which is exhausted from the metering valve in a direction transverse to the axial movement of the pin in the valving chamber so that the pressures of the metered flow within the valving chamber exert balanced forces upon the metering pin, the chamber of said metering valve, said reservoir, and the inlet-outlet ports of said cylinder being joined together in series to complete a closed hydraulic system wherein the chamber of said metering valve is in constant communication with the fluid throughout said system, a piston working in said cylinder to force a portion of said fluid through the pressure metering port to effect axial movement of said metering pin and another portion of said fluid through the inlet port of said metering valve into said valving chamber and around said balanced metering pin to meter the flow of the fluid through the valving chamber and exhaust said metered fluid into said reservoir.

References Cited in the file of this patent

UNITED STATES PATENTS

| | | |
|---|---|---|
| 2,001,988 | Temple | May 28, 1935 |
| 2,161,811 | Grebe | June 13, 1939 |
| 2,309,499 | Chenault | Jan. 26, 1943 |
| 2,378,417 | Linsley | June 19, 1945 |
| 2,603,235 | Kirkham | July 15, 1952 |
| 2,668,603 | Winslow | Feb. 9, 1954 |
| 2,672,952 | Smith | Mar. 23, 1954 |